Dec. 15, 1959    A. M. HATCH    2,917,080
SERVO VALVE
Filed May 2, 1958
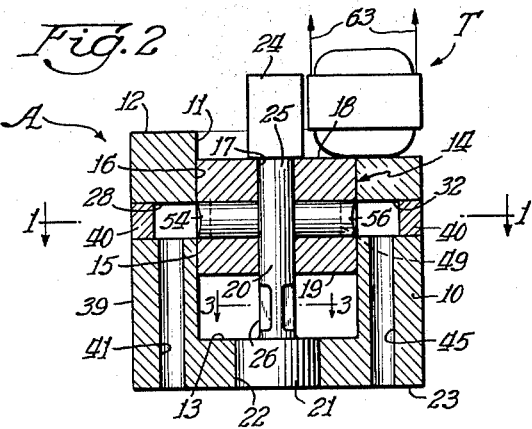
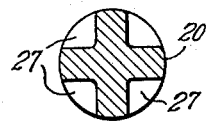
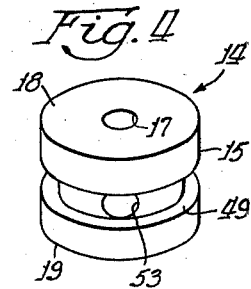
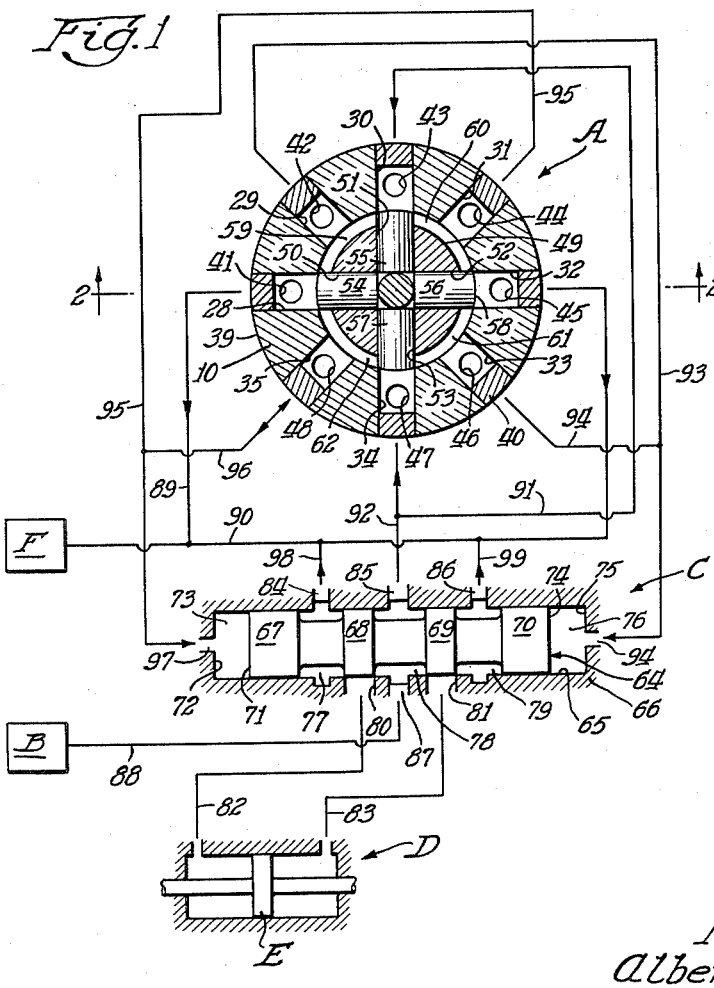
Inventor:
Albert M. Hatch
By: Frank C. Parker Atty.

United States Patent Office 2,917,080
Patented Dec. 15, 1959

2,917,080

SERVO VALVE

Albert M. Hatch, Marblehead, Mass., assignor, by mesne assignments, to Borg-Warner Corporation, Chicago, Ill., a corporation of Illinois Application May 2, 1958, Serial No. 732,563

11 Claims. (Cl. 137—624)

This invention relates to a hydraulic servo valve, and, in particular, to a hydraulic servo or control valve which is adapted to interconnect a source of fluid pressure with a utilization device in accordance with a particular control signal.

It is well known in the art to provide a hydraulic system having a control valve with a movable member that is moved in response to a control signal, such as an electrical impulse signal, to control the actuation of an utilization device. The movement of the valve member of the control valve may either interconnect a source of pressure fluid directly with a load or utilization device for actuation thereof or effect movement of a movable member of a larger controlled valve which movement thereof, in turn, interconnects the pressure fluid source with the load or utilization device. Such hydraulic systems are commonly used in modern day aircraft where information in the form of an electrical impulse signal is fed from an electronic computer to a control valve whereupon the energized control valve has a valve member thereof moved in response and in accordance with that particular control signal to interconnect a source of pressure fluid with a larger controlled valve causing movement of a valve member thereof. This movement of the valve member of the larger controlled valve interconnects the source of pressure fluid with a utilization device whereby the movement or actuation of the utilization device is proportionate with and in accordance with that particular electrical control signal. These systems are normally used in conjunction with electronic computers of automatic guidance and fire control equipment for missiles and other armament apparatus and navigational apparatus.

Since the electronic computers are very accurate in the sensing thereof for determining the necessity of actuation of the utilization device, a relatively weak electrical signal will be fed to the control valve. Since the control signal is relatively weak and the movement of the utilization device must be responsive to that signal, the structure of the control valve must be relatively small and still be adapted to be accurate in the movement thereof so that the utilization device will be actuated with accuracy.

The conventional servo valve utilized in the systems mentioned above normally comprises a movable valve member which is moved axially in either direction, from a null position, depending upon the particular electrical control signal, interconnecting various passage means in order to effect interconnection of the pressure fluid source in the correct manner either with a larger controlled valve or directly with the utilization device. The flow of pressure fluid directed to the controlled valve effects movement of a valve member thereof in the proper direction from its null position to thereby cause the correct movement of the utilization device proportionate to and in accordance with the control signal.

It is an object of this invention to provide an improved servo valve for a hydraulic system as set forth in the preceding paragraph which has a valve member rotated in response to a control signal to effect fluid communication between the control valve and a utilization means.

It is another object of this invention to provide a servo valve having a rotatable member therein which is actuated in response to a relatively weak control signal which when in its null position holds the tendency of fluid leakage thereof to a minimum.

A further object of this invention is to provide a servo valve that is relatively simple to manufacture yet is adapted to be accurate in the movement of the actuating member thereof in order to interconnect a pressure fluid source with a utilization means.

It is still another object of this invention to provide a hydraulic servo valve having a rotatable valve member therein which is rotated in response to a relatively weak control signal whereby the rotated valve member is adapted to interconnect a source of pressure fluid with one of a pair of utilization means and simultaneously interconnect the other utilization means with a sump.

Other and more particular objects, uses, and advantages of this invention will become apparent upon a reading of the following specification taken in connection with the accompanying drawing which forms a part thereof wherein:

Figure 1 illustrates a servo valve, shown in enlarged scale and in axial cross section taken on line 1—1 of Figure 2, incorporated in a hydraulic control system which is shown schematically.

Figure 2 illustrates in cross section the servo valve of Figure 1 taken on line 2—2 thereof.

Figure 3 is a cross-sectional view of a member of the servo valve illustrated in Figure 2 taken on line 3—3 thereof.

Figure 4 is a perspective view of the rotatable valve member of the servo valve illustrated in Figure 2.

Reference is made to the drawing wherein like reference numerals are used throughout the various figures thereof to illustrate like parts, and particular reference is made to Figure 1 which illustrates a hydraulic system having a control valve, generally indicated by reference letter A, adapted to fluidly interconnect a pressure fluid source B with a controlled valve C. Movement of a valve member of the controlled valve C, in turn, effects fluid communication between the pressure fluid source B and the utilization device, load, or hydraulic motor D for the actuation thereof.

This invention relates only to the servo or control valve A and not to the particular hydraulic system utilized. It is to be understood that the control valve A is adapted for application in many different hydraulic systems and is not limited to the hydraulic system illustrated in Figure 1. The system illustrated in Figure 1 may be utilized for actuating aircraft mechanism and may be incorporated into the automatic navigational system of an aircraft. If the system is so utilized, the automatic pilot or electronic computer when having been set for a predetermined flight course of the aircraft will upon sensing a deviation of the aircraft from the predetermined flight course will supply the information of the deviation in the form of an electrical impulse signal to the control valve A. The control valve A amplifies and converts the electrical control signal into a hydraulic flow of pressure fluid from the source B upon movement of a valve member thereof and interconnects the flow of pressure fluid with the controlled valve C. The hydraulic flow of fluid to the controlled valve C is proportional to and in accordance with the strength of the control signal. This hydraulic flow effects movement of a movable member of the controlled valve C, which movement or displacement is proportionate to and in accordance with that control signal and interconnects the fluid source B with either side of the motor D to effect movement of the piston E thereof in the desired direction and for the desired magnitude of displacement. The direction and magnitude of displacement of piston E is in response to that particular electrical control signal. The piston E may be connected to suitable actuating members to effect movement of an aircraft air foil such as the rudder. Therefore, it can be seen that the navigational electronic computer upon sensing a deviation of the aircraft from the predetermined flight course will cause movement of the piston E in the desired direction and magnitude of displacement to cause movement of the aircraft rudder to return the aircraft to its predetermined flight course.

The servo or control valve A will now be described. As shown in Figures 1 and 2, the control valve A comprises a cup-shaped housing 10 having a substantially cylindrical bore 11 interrupting one end 12 of the housing 10 and terminating within the housing 10 to form an inner end wall 13 thereof. A substantially cylindrical piston 14 is disposed within housing bore 11 and has a diameter substantially the same size as or slightly smaller than the diameter of housing bore 11. In this manner, piston 14 is adapted to be rotatable within bore 11 yet have an outer peripheral surface 15 thereof in sealing relation with an inner peripheral surface 16 of the housing 10. Piston 14 is provided with a central bore 17 passing through the opposed ends 18 and 19 of the piston 14. A shaft 20 is telescopically disposed within bore 17 of the piston 14 and is provided with an enlarged end 21 at one end thereof which is adapted to be telescopically received in a bore 22 in the housing 10. The bore 22 interrupts the inner end wall 13 of the housing 10 and passes through the housing 10 interrupting a mounting surface 23 of the housing 10. The enlarged portion 21 of the shaft 20 may be formed integrally with the shaft 20 or formed separately and suitably fastened to the shaft 20 in any well known manner. The enlarged end 21 of the shaft 20 is adapted to be non-rotatably disposed and fixed within the bore 22 of housing 10. It should be noted that the enlarged portion 21 is spaced from the side 19 of the piston 14 when assembled. The shaft 20 is adapted to have an armature 24 formed on the other end 25 of the shaft 20 adjacent the side 18 of the piston 14. The armature 25 may be suitably fastened to the end 25 of the shaft 20 and also to the end 18 of the piston 14 whereby the piston 14, shaft 20, and armature 24 are suitably secured together to form a unitary structure.

The shaft 20 is formed with a reduced or cutout portion 26 at a point intermediate the enlarged end 21 thereof and the end 19 of the piston 14. As shown in Figure 3, the reduced portion 26 of the shaft 20 provides an axial cross section. This is a substantially "cross" configuration provided by the cut away portions 27. However, the reduced portion 26 may have any cross-sectional configuration. The essential feature is to provide a torsional resiliency of the shaft 20 whereby slight rotational movement of the piston 14 will be permitted by the reduced portion 26 even though the end 21 of the shaft 20 is fixed relative to the housing 10. It should be understood that the enlarged end 21 of the shaft 20 not only is fixed to the housing 10 to prevent rotation of the enlarged end 20 but also prevents axial movement of the piston 14 relative to the housing 10.

The housing 10 is provided with a plurality of spaced, aligned, radial passages 28–35 which interconnect the outer peripheral surface 39 of the housing 10 with the inner peripheral surface 16 thereof. The passages 28–35 are each provided with a sealing pin means 40 adapted to completely seal off a portion of the passage at the outer peripheral surface 39 of the housing 10. It should be understood that it is not necessary to form passages 28–35 completely through the housing 10 but that they may be formed by only interrupting the inner peripheral surface 16 of the housing 10 and terminating at a predetermined point within the housing 10. However, the preferred method of forming such passageways is to drill or bore the passages from the outer peripheral surface 39 to the inner peripheral surface 16 and then close off the ends thereof at the outer peripheral surface 39 of the housing 10.

The housing 10 is also provided with a plurality of passages 41–48. Each passage 41–48 interrupts the mounting surface 23 of the housing 10 and interconnects the surface 23 respectively with one of the passages 28–35. The passages 41–48 may be circumferentially disposed about the surface 23 and extend substantially parallel to the axis of the bore 11. The passages 41–48 may interconnect the respective passages 28–35 substantially perpendicularly.

Piston 14 is provided with an annular groove or recess means 49 in its outer peripheral surface 15 intermediate the end surfaces 18 and 19 thereof. The recess 49 is so formed in the piston 14 that when the piston 14 is assembled within the housing 10 the recess 49 interconnects with passages 28–35 at the inner peripheral surface 16 of the housing 10. The width of the recess 49 is formed substantially the same size as or slightly smaller than the diameters of the passages 28–35.

The piston 14 is also provided with a plurality of equally spaced, aligned, radial bores 50–53. Each bore 50–53 has substantially the same size diameter as or a slightly larger diameter than the passages 28–35. A plurality of pin means 54–57 are disposed respectively in the piston bores 50–53. These pin means 54–57 may each be formed with an arcuate outer end surface 58 whereby the pin means are adapted to permit rotational movement of the piston 14 within the housing bore 11 yet maintain a sealing relation with the inner peripheral surface 16 of the housing 10. The pin means 54–57 are so disposed within bores 50–53 that the pin means 54–57 divide the recess means 49 into four substantially equal sections 59, 60, 61, and 62.

Since the enlarged end 21 of the shaft 20 carrying the piston 14 is fixed relative to the housing 10, slight rotation of the piston 14 relative to the housing 10 upon rotation of the armature end of the shaft 20 is permitted by the torsional spring means created by the reduced portion 26 of the shaft 20. In this manner the torsional spring means 26 tends to maintain the piston 14 in a predetermined position relative to the housing 10. When the piston 14 is in this predetermined position, the pin means 54 prevents fluid communication between passage 28 and either of the adjacent sections 59 and 62 of the groove 49. Therefore, the pin means 54 prevents fluid communication between passage 28 and either of the adjacent passages 29 and 35. In a like manner the pin means 55 prevents fluid communication between passage 30 and either of the passages 29 and 31. Similarly, the pin means 56 prevents fluid communication between passage 32 and either of the adjacent passages 31 and 33, and the pin means 57 prevents fluid communication between passage 34 and either of the adjacent passages 33 and 35. One method of forming the radial bores 50–53 to assure coaxial alignment thereof with respect to housing bores 28, 30, 32, and 34 so that the pin means 54–57 prevents fluid communication as set forth above, is to form the bores 50–53 when the piston 14 is assembled within the housing 10 and either drilling them simultaneously with the housing bores or using the housing bores as guides for the drilling tool when drilling the piston bores 50–53.

A torque motor T may be suitably mounted to the housing 10 adjacent to the armature 24. The torque motor T is suitably connected to an electrical computer or other signal transmitting device (not shown) by electrical wire connections 63. When the torque motor T is energized by the electronic computer feeding electrical signals thereto, the torque motor T, in a manner well known in the art, will cause slight rotation of the armature 24 and subsequently slight rotation of the piston 14 in either a clockwise or counterclockwise direction relative to the housing 10 depending upon the particular electrical signal. Further, the magnitude of rotation of the armature 24 and the piston 14 will be dependent upon the strength of that electrical signal. It is to be understood that the rotation of the unitary structure of the armature 24, shaft 20, and piston 14 is in opposition of the spring means 26 tending to maintain the piston 14 in a predetermined position relative to the housing 10.

The controlled valve C comprises an axially movable piston 64 disposed within a bore 65 formed in a housing 66. The piston 64 is provided with a plurality of spaced enlarged lands 67, 68, 69, and 70. The lands 67 and 70 are respectively disposed at the opposed ends of the piston 64 and lands 68 and 69 are disposed intermediately on the piston 64 and are respectively spaced from lands 67, 70, and from each other. An end face 71 of the land 67 defines with an end 72 of bore 65 a chamber or utilization means 73. Similarly, an end face 74 of the land 70 defines with an end 75 of bore 65 a chamber or utilization means 76. The lands 67 and 68 cooperate with bore 65 to form a chamber 77 therebetween. Lands 68 and 69 in cooperation with bore 65 define a chamber 78 therebetween. Likewise, lands 69 and 70 define a chamber 79 with the bore 65. The housing 66 is formed with a pair of spaced passages 80 and 81. Passages 80 and 81 are respectively interconnected with conduits 82 and 83 that are respectively in fluid communication with the left and right side of the motor D. When piston 64 is fully centered within the bore 65, i.e., in its null position, the land 68 prevents fluid communication between passage 80 and either of the adjacent chambers 77 and 78. In the same manner, the land 69 prevents fluid communication between passage 81 and either of the chambers 78 and 79.

The housing 66 is formed with three spaced passage means 84, 85, and 86 which are respectively in fluid communication with chambers 77, 78, and 79. A passage 87 is formed in housing 66, opposed from the passage 85, and is in fluid communication with chamber 78 and the pressure fluid source B by means of an interconnecting conduit 88.

The passages 41-48 of the control valve A are suitably interconnected to various conduits in the following manner to provide fluid communication between the control valve A and the controlled valve C: The passage 41 and the diametrically opposite passage 45 are fluidly interconnected with a sump or return means F by interconnecting conduits 89 and 90. The passage 43 and its diametrically opposite passage 47 are interconnected by conduit 91 which is, in turn, fluidly interconnected with chamber 78 of the controlled valve C by a conduit 92 fluidly interconnected to the conduit 91 at one end thereof and to the passage 85 at the other end thereof. It can be seen, therefore, that passages 43 and 47 are in fluid communication with the pressure fluid source B by means of the conduit 88, passage 87, chamber 78, passage 85 and interconnecting conduits 92 and 91. The passage 42 and the diametrically opposite passage 46 are fluidly interconnected by respective interconnecting conduits 93 and 94. The conduit 93 is also in fluid communication with chamber 76 of the controlled valve C by means of an interconnecting passage 94 formed in the housing 66. The passages 44 and 48 of the control valve A are fluidly interconnected by respective interconnected conduits 95 and 96. The conduit 95 is in fluid communication with chamber 73 of the controlled valve C by means of an interconnecting passage 97 formed in the housing 66. Chambers 77 and 79 of the controlled valve C are respectively interconnected to the sump F by conduits 98 and 99, each connected at one end thereof to conduit 90 and each respectively connected at the other end to passages 84 and 86 of housing 66.

The operation of the hydraulic system depicted in Figures 1 and 2 is as follows: When the torque motor T is non-energized, pressure fluid from the source B is communicated by the conduit 88 and the passage 87 to the chamber 78 of the controlled valve C. The pressure fluid within chamber 78 is prevented from passing to the motor D by the lands 68 and 69 of the piston 64 sealing off the conduits 82 and 83 respectively as the piston 64 is in its null or centered position. The pressure fluid within chamber 78 is also in communication with the passages 47, 34 and the passages 43, 30 of the control valve A. Since piston 44 is in its predetermined position relative to the housing 10, i.e., in its null position, the pin means 55 and 57 respectively prevent fluid communication between the passage 30 and either of the adjacent passages 28 and 31 and between the passage 34 and either of the adjacent passages 35 and 33. Therefore, it can be seen that when the torque motor T is non-energized the hydraulic system is at rest and the only tendency of fluid leakage past the control valve A is prevented by the pin means 55 and 57. Since only the pin means 55 and 57 of the control valve A are subject to fluid leakage threaround, the manfunctioning of the system is held to a minimum even though the control valve A is relatively small.

When the electronic computer senses a need for moving the piston E of the motor D to the left a desired distance to correct for some deviation of the aircraft from its predetermined flight course, the computer feeds this information in a form of an electrical signal to the torque motor T. The strength of the signal thus transmitted determines the extent of the displacement of the piston E to the left and the particular characteristics of the signal deermine the direction in which the piston E is to be moved. The torque motor T thus energized causes rotation of the armature and the connected piston 14 in a counterclockwise direction in opposition to the force of the torsional spring means 26. The extent of the rotation of the piston 14 relative to the housing 10 is proportional to the strength of the signal transmitted to the torque motor T. Upon rotation of the piston 14 in a counterclockwise direction as viewed in the drawing, the pin means 55 permits fluid communication between the passage 30 and the passage 31 by the interconnecting section 60. Similarly, the pin means 57 permits fluid communication between the passage 34 and the passage 35 by the interconnecting section 49. The flow of fluid thus communicated to the passages 31 and 35 is communicated to the chamber or utilization means 73 of the controlled valve C by the interconnecting conduits 95 and 96. The force of the pressure fluid in the chamber 73 acts upon the end surface 71 of the land 67 of the piston 64 and causes axial movement thereof to the right. Any pressure fluid present within chamber 76 will be forced therefrom by the piston effect of the end surface 74 of land 70 to the sump F by means of the interconnecting conduits 93 and 94. The conduit 93 is interconnected with the sump F by means of passages 44, 29, section 59, passages 38 and 41 and interconnecting conduits 89 and 90. Conduit 94 is interconnected with the sump F by passages 46 and 33, section 61, passages 32 and 45, and conduit 90.

Movement of the piston 64 to the right effects fluid communication between chamber 78 and conduit 83 and thereby permits a flow of pressure fluid from the source B to the right side of the motor D by the interconnecting conduit 88, passage 87, chamber 78, passage 81, and conduit 83. The force of the pressure fluid now directed to the right of piston E effects axial movement thereof to the left. The pressure fluid expelled from the left side of the piston E, upon movement thereof to the left, passes to the sump F by means of the conduit 82, passage 80, chamber 77, passage 84, and interconnecting conduits 97 and 90.

When the piston E has moved to its predetermined position, the electronic computer will terminate the electrical signal to the torque motor T and the spring means 26 of the control valve A will return the piston 14 to its predetermined or null position. Since the piston 64 of the controlled valve C is displaced to the right, the piston 64 may be returned to its null position by any suitable means well known in the art. If piston 64 were not returned back to its null position, the pressure fluid source B would remain in fluid communication with the right side of the motor D tending to cause pitson E to be displaced further to the left than the displacement desired by the electronic computer. Such overshooting of the piston E from its predetermined displaced position would cause the torque motor T to be energized as the computer would then sense a further deviation of the aircraft from its predetermined flight course and effect movement of the piston E to the right to overcome this overshooting of the piston E. A repetitious hunting would occur in the system as the electronic computer would attempt to displace piston E to a predetermined position. As previously stated, anti-hunting means are well known in the art and one such means would be to provide a helical spring in each of the chambers 73 and 76 of the controlled valve C. These springs would tend to center piston 64 in its null position. A relief valve means could be provided for each chamber 73 and 76 would be actuated to the open position upon discontinuance of an electrical signal to the torque motor T which would permit any fluid pressure within chambers 73 and 76 to be vented to the sump F. The check valves would be automatically closed upon the transmission of an electrical control signal to the torque motor T and would remain open when the torque motor T is not energized. Other means could also be provided to return piston 64 to its null position. Such means comprise a fluid flow feed back arrangement as set forth in the copending patent application filed April 21, 1958, Serial No. 729,990. This feed back arrangement will cause a rotation of the piston 14 in an opposite direction upon termination of the electrical signal to the torque motor T, and permit a reverse flow of fluid from the control valve A to the controlled valve C. Pressure fluid would then enter chamber 76 and chamber 73 would then be vented to the sump F causing movement of the piston 64 to the left. When the movement of the piston 64 to the left returns the piston 64 to its null or centered position, the feed back arrangement sensing this condition permits the spring means 26 to return the piston 14 to its null or predetermined position, thus putting the hydraulic system in its neutral or unactuated condition.

When it is desired that the piston E is to be moved to the right, the electronic computer energizes the torque motor T with a particular control signal which causes clockwise rotation of the piston 44. The piston E is moved to the right in a manner converse to that presented above for leftward movement of the piston E.

It should be understood that the control valve A could directly interconnect the pressure fluid source B with the motor D without using a larger controlled valve C as set forth above. The purpose of the larger controlled valve C is to effect amplification of the control signal and permit a greater volume of fluid to pass to the motor D than would be able to pass through the relatively small control valve A.

It can be seen that a servo valve or control valve has been disclosed which is relatively simple to manufacture yet provides for accurate control of a hydraulic system by converting an electrical control signal into a pressure fluid flow for actuating a utilization device in accordance with that particular electrical signal. The servo valve thus disclosed prevents fluid leakage in the system when it is in its null position and, therefore, eliminates the tendency of malfunctioning because of misalignment of parts.

While the various parts of this invention have been referred to as being located in the right or left position and moving to the right or left, or rotating clockwise or counterclockwise, it will be understood that this is done solely for the purpose of facilitating description and such references relate only to the relative positions or movements of the parts as shown in the accompanying drawing.

Also, it is to be understood that many changes and modifications may be made to the structure of the servo valve disclosed without departing from the spirit and scope of the invention which is defined by the appended claims.

What is claimed is:

1. A fluid control valve device comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage and a pair of passages being so disposed whereby each passage of said pair is disposed adjacent to said one passage; means defining recess means in said piston; a plurality of pin means carried by said piston dividing said recess means into at least two sections, one of said pin means being adapted to prevent fluid communication between said one passage and each passage of said pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said pair.

2. A fluid control valve device comprising: a housing having a bore therein; a rotatable piston having a pair of opposed sides disposed in said bore; a shaft carried by said piston having end portions projecting beyond said sides of said piston, one of said end portions being fixed to said housing; means defining torsional spring means in said one end portion of said shaft tending to maintain said piston in a predetermined rotational position relative to said housing; means defining a plurality of spaced passage means disposed in said housing interconnecting said bore with the exterior of said housing, said passage means including at least one passage and a pair of passages being so disposed whereby each passage of said pair is disposed adjacent to said one passage; means defining recess means in said piston; a plurality of pin means carried by said piston dividing said recess means into at least two sections, one of said pin means being adapted to prevent fluid communication between said one passage and each passage of said pair when said piston is in said predetermined position; and means operatively associated with the other end portion of said shaft being adapted to cause selected rotational movement of said piston relative to said housing in opposition to said spring means whereby said one pin means permits one of said sections to fluidly interconnect said one passage with one of the passages of said pair.

3. A fluid control valve device comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage and a pair of passages being so disposed whereby each passage of said pair is disposed adjacent to said one passage; means defining an annular recess means in said piston; means defining a plurality of radial bore means in said piston, one of said radial bore means being coaxial with said one passage when said piston is in its said predetermined position; a plurality of pin means disposed in said bore means dividing said recess means into at least two sections, one of said pin means disposed in said one radial bore means being adapted to prevent fluid communication between said one passage and each passage of said pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said pair.

4. A fluid control valve device comprising: a housing having a bore therein; a rotatable piston having a pair of opposed sides disposed in said bore; a shaft carried by said piston having end portions projecting beyond said side of said piston, one of said end portions being fixed to said housing; means defining a reduced portion of said one end portion of said shaft to provide torsional spring means tending to maintain said piston in a predetermined rotational position relative to said housing, said reduced portion having a cross cross-sectional configuration; means defining a plurality of spaced passage means disposed in said housing interconnecting said bore with the exterior of said housing, said passage means including at least one passage and a pair of passages being so disposed whereby each passage of said pair is disposed adjacent to said one passage; means defining an annular recess means in said piston; a plurality of pin means carried by said piston dividing said recess means into at least two sections, one of said pin means being adapted to prevent fluid communication between said one passage and each passage of said pair when said piston is in said predetermined position; and means operatively associated with the other end portion of said shaft being adapted to cause selected rotational movement of said piston relative to said housing in opposition to said spring means whereby said one pin means permits one of said sections to fluidly interconnect said one passage with one of the passages of said pair.

5. A fluid control valve device for selectively interconnecting a source of pressure fluid with one of a pair of utilization means, said control valve device comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage and a pair of passages being so disposed whereby each passage of said pair is disposed adjacent to said one passage; means fluidly interconnecting said one passage with said source of pressure fluid; means fluidly interconnecting each passage of said pair with each utilization means of said pair; means defining an annular recess means in said piston; a plurality of pin means carried by said piston dividing said recess means into at least two sections, one of said pin means being adapted to prevent fluid communication between said one passage and each passage of said pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said pair to thereby fluidly interconnect said source of pressure fluid with one of the utilization means of said pair.

6. A fluid control valve device comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage, a first pair of passages and a second pair of passages being so disposed whereby each passage of said first pair is disposed adjacent said one passage and each passage of said second pair is disposed remote from said one passage and adjacent to one of the passages of said first pair; means defining recess means in said piston; a plurality of pin means carried by said piston dividing said recess means into at least two sections, one of said pin means being adapted to prevent fluid communication between said one passage and each passage of said first pair and other of said pin means being adapted to prevent fluid communication between each passage of said first pair and its adjacent passage of said second pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said first pair and another of said sections to fluidly interconnect the other passage of said first pair with its said adjacent passage of said second pair.

7. A fluid control valve device comprising: a housing having a bore therein; a rotatable piston having a pair of opposed sides disposed in said bore; a shaft carried by said piston having end portions projecting beyond said sides of said piston, one of said end portions being fixed to said housing; means defining torsional spring means in said one end portion of said shaft tending to maintain said piston in a predetermined rotational position relative to said housing; means defining a plurality of spaced passage means disposed in said housing interconnecting said bore with the exterior of said housing, said passage means including at least one passage, a first pair of passages and a second pair of passages being so disposed whereby each passage of said first pair is disposed adjacent said one passage and each passage of said second pair is disposed remote from said one passage and adjacent to one of the passages of said first pair; means defining recess means in said piston; a plurality of pin means carried by said piston dividing said recess means into at least two sections, one of said pin means being adapted to prevent fluid communication between said one passage and each passage of said first pair and other of said pin means being adapted to prevent fluid communication between each passage of said first pair and its adjacent passage of said second pair when said piston is in said predetermined position; and means operatively associated with the other end portion of said shaft being adapted to cause selected rotational movement of said piston relative to said housing in opposition to said spring means whereby said one pin means permits one of said sections to fluidly interconnect said one passage with one of the passages of said first pair and another of said sections to fluidly interconnect the other passage of said first pair with its said adjacent passage of said second pair.

8. A fluid control valve device comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage, a first pair of passages and a second pair of passages being so disposed whereby each passage of said first pair is disposed adjacent said one passage and each passage of said second pair is disposed remote from said one passage and adjacent to one of the passages of said first pair; means defining an annular recess means in said piston; means defining a plurality of spaced radial bore means in said piston, said radial bore means including at least one radial bore and a pair of bores whereby said one radial bore is coaxial with said one passage and each radial bore of said pair is coaxial with each passage of said second pair when said piston is in its predetermined position; a plurality of pin means disposed in said radial bore means dividing said recess means into at least two sections, one of said pin means disposed in said one radial bore being adapted to prevent fluid communication between said one passage and each passage of said first pair and other of said pin means disposed in said pair of radial bores being adapted to prevent fluid communication between each passage of said first pair and its adjacent passage of said second pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said first pair and another of said sections to fluidly interconnect the other passage of said first pair with its said adjacent passage of said second pair.

9. A fluid control valve device comprising: a housing having a bore therein; a rotatable piston having a pair of opposed sides disposed in said bore; a shaft carried by said piston having end portions projecting beyond said sides of said piston, one of said end portions being fixed to said housing; means defining a reduced portion of said one end portion of said shaft to provide torsional spring means tending to maintain said piston in a predetermined rotational position relative to said housing, said reduced portion having a cross cross-sectional configuration; means defining a plurality of spaced passage means disposed in said housing interconnecting said bore with the exterior of said housing, said passage means including at least one passage, a first pair of passages and a second pair of passages being so disposed whereby each passage of said first pair is disposed adjacent said one passage and each passage of said second pair is disposed remote from said one passage and adjacent to one of the passages of said first pair; means defining an annular recess means in said piston; a plurality of pin means carried by said piston dividing said recess means into at least two sections, one of said pin means being adapted to prevent fluid communication between said one passage and each passage of said first pair and other of said pin means being adapted to prevent fluid communication between each passage of said first pair and its adjacent passage of said second pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said first pair and another of said sections to fluidly interconnect the other passage of said first pair with its said adjacent passage of said second pair.

10. A fluid control valve device being adapted to selectively interconnect one of two utilization means with a pressure fluid source and simultaneously interconnect the other of said utilization means wtih a sump comprising: a housing having a bore therein; a rotatable piston disposed in said bore; means carried by said housing preventing axial movement of said piston relative to said housing; said last-named means including spring means tending to maintain said piston in a predetermined rotational position relative to said housing; means defining a plurality of spaced passage means disposed in said housing interconnecting said bore with the exterior of said housing, said passage means including at least one passage, a first pair of passages and a second pair of passages being so disposed whereby each passage of said first pair is disposed adjacent said one passage and each passage of said second pair is disposed remote from said one passage and adjacent to one of the passages of said first pair; means fluidly interconnecting said one passage with said pressure fluid source; means fluidly interconnecting each passage of said first pair with each of said utilization means; means fluidly interconnecting each passage of said second pair with said sump; means defining an annular recess means in said piston; a plurality of pin means carried by said piston dividing said recess means into at least two sections, one of said pin means being adapted to prevent fluid communication between said one passage and each passage of said first pair and other of said pin means being adapted to prevent fluid communication between each passage of said first pair and its adjacent passage of said second pair when said piston is in said predetermined position; and means operatively associated with said piston being adapted to cause selected rotational movement of said piston relative to said housing in opposition to said spring means whereby said one pin means permits one of said sections to fluidly interconnect said one passage with one of the passages of said first pair and another of said sections to fluidly interconnect the other passage of said first pair with its said adjacent passage of said second pair to thereby fluidly interconnect one of said utilization means with said pressure fluid source and the other of said utilization means with said sump.

11. A fluid control valve device comprising: a housing having a bore therein; a rotatable member disposed in said bore; means operatively interconnected with said member and tending to maintain said member in a predetermined rotational position relative to said housing; means defining a plurality of passages disposed in said housing interconnecting said bore with the exterior of said housing, said passages including at least one passage and a pair of passages each being disposed adjacent said one passage; means defining recess means in said member; pin means carried by said member dividing said recess means into at least two sections, said pin means being adapted to prevent fluid communication between said one passage and each passage of said pair of passages when said member is in said predetermined position; and means operatively associated with said member and being adapted to cause selected rotational movement of said member relative to said housing in opposition to said means tending to maintain said member in a predetermined position whereby said pin means permit one of said sections to fluidly interconnect said one passage with one of the passages of said pair of passages.

References Cited in the file of this patent

UNITED STATES PATENTS

| | | |
|---|---|---|
| 825,370 | Zurbuch | July 10, 1906 |
| 2,599,159 | Breedlove | June 3, 1952 |